3,034,952
BENZENESULFONIC ACID NEMATOCIDES

Geoffrey H. Beames, Orlando, Fla., and Everett E. Gilbert, Morris Township, Morris County, Curtis Richardson, Hanover Township, Morris County, and Benjamin Veldhuis, Morris Township, Morris County, N.J., assignors to Allied Chemical Corporation, New York, N.Y., a corporation of New York
No Drawing. Filed Apr. 28, 1960, Ser. No. 25,207
7 Claims. (Cl. 167—30)

The present invention relates to improvements in the control of nematodes.

Although reference is made hereinafter to the control of nematodes, it is intended that the invention include control of related parasitical organisms, such as wire worms, grubs and maggots.

Plants subjected to attack by nematodes are damaged primarily as a result of the feeding of the nematodes on the plant tissues. The damage is generally manifested by the growth of galls, root-knots and other abnormalities. Such galls or root-knots contain nematodes and/or nematodes larvae. Gall formation not only reduces the size and effectivenes of the root system but also seriously affects other plant parts so that, unless treated, the plant dies.

Although various nematocides have been proposed, there is an acute need for new and better nematocides. The principal object of the invention is to provide nematocides which are less expensive and less toxic to plants than those now in use. Other objects will be apparent from the following description.

At the present time, fumigants such as ethylene dibromide, dichloropropene-dichloropropane mixture and chloropicrin are the chemicals most extensively used as nematocides on a commercial scale. All of these fumigants are phytotoxic to such an extent that it is necessary to treat the soil several weeks prior to planting of a crop in order that the fumigant may leave the soil.

According to the present invention, nematodes are controlled by impregnating nematode-infested soil with a toxic quantity of a nematocide comprising as active ingredient a member of the group consisting of dodecylbenzenesulfonic acid, pentadecylbenzenesulfonic acid and salts thereof.

Control of nematodes by use of the sulfonated compounds of this invention has been found to strikingly improve the growth characteristics of plants. Thus, crops raised in the treated soil have more luxuriant tops and roots and are of a greater total weight than those obtained from untreated soil.

The sulfonated compounds which may be employed as active ingredients comprise dodecylbenzenesulfonic acid, pentadecylbenzenesulfonic acid and inorganic and organic salts thereof, including their alkali metal, e.g. sodium and potassium, calcium, magnesium, ammonium, aniline, anthranilic, triethanolamine, pyridine, dodecylamine, ethylenediamine, diethylenetriamine and glycine salts. Commercial forms of the dodecylbenzene and pentadecylbenzene sulfonated compounds, particularly commercial sodium salts of dodecylbenzene and pentadecylbenzenesulfonic acids, have been used with outstanding success. These commercial products have an average chain length of about 12 carbon atoms in the case of the dodecylbenzene compounds and an average chain length of about 15 carbon atoms in the case of the pentadecylbenzene compounds.

The sulfonated compounds may be introduced into the soil "as is" or in a variety of nematocidal compositions. The nature of these compositions will depend primarily upon the particular application contemplated. The compositions may be applied to the nematode-infested soil in any conventional manner, as by spraying, drenching or dusting. The term "soil" as used herein is intended to include any medium capable of supporting the growth of plants. It is, therefore, intended to include in addition to soil, humus, manure, compost, sand and artificially created plant growth media, including hydroponic media.

In a preferred embodiment of the invention, the sulfonated compounds are distributed in the soil by introduction in water, such as that employed to irrigate the soil. In this procedure, the amount of water may be varied in accordance with the moisture content and the moisture equivalent of the soil in order to obtain the desired depth of distribution of the toxicant compounds.

The sulfonated compounds may also be formulated as dust or granular compositions containing carriers or fillers such as talc, sand, fuller's earth, chalk, gypsum, etc., including active ingredients such as fertilizers, insecticides and/or fungicides.

The sulfonated compounds may be used for controlling nematodes in either pre-emergent or post-emergent treatment without substantially affecting crops planted or growing in the soil. This low phytotoxicity of the compounds, in addition to their cheapness, provides the art with nematocides which have no parallel in those now in use or otherwise proposed.

The use of a toxic quantity of the sulfonated compounds (active ingredients) is essential for practice of the present invention. The sulfonated compounds are effective when distributed in nematode-infested soil at dosage of at least about 100 pounds per acre, and preferably about 100 to 250 pounds per acre. In the case of post-emergent treatment, minimal dosages are preferred. It is desirable that the soil be impregnated with the sulfonated compounds to a depth of at least about 6 inches.

The concentration of the sulfonated compounds in aqueous and dust compositions may vary within wide limits, provided the required dosage of active ingredient is supplied to the soil. Generally speaking, the concentration of the sulfonated compounds in the compositions ranges from about 0.01 to about 50% by weight.

The following examples illustrate the invention but are not to be construed as limiting the same.

EXAMPLE 1

The nematocidal activity of representative sulfonated compounds of this invention was determined by a procedure essentially as described by Schuldt and Bluestone in "Contributions of the Boyce Thompson Institute," 19, 65 (1957). *Panagrellus redivivus* (Linné) nematode culture was added to an aqueous solution containing 50 to 250 p.p.m. of the sulfonated compound, and observations were made after ten days. The test apparatus consisted of four (2 tops and 2 bottoms) Petri dishes (size 69 mm. x 15 mm.) placed within a larger Petri dish (size 150 mm. x 20 mm.). This arrangement allowed testing of a single dosage of the compound with four replicates or testing of two dosages with only two replicates in each large Petri dish. Since male nematodes are easily destroyed, the results were recorded as estimated percentage kill of female (F) and larval (L) nematodes. The results are given in the following tables:

Table 1

| Compound | Percent Kill | | | | | |
|---|---|---|---|---|---|---|
| | 250 p.p.m. | | 100 p.p.m. | | 50 p.p.m. | |
| | F | L | F | L | F | L |
| (1) dodecylbenzenesulfonic acid [a] | 100 | 100 | 100 | 100 | 100 | 100 |
| (2) sodium salt of (1) | 100 | 100 | 100 | 100 | 100 | 98 |
| (3) ammonium salt of (1) | 100 | 100 | 100 | 100 | 100 | 90 |
| (4) triethanolamine salt of (1) | 100 | 100 | 100 | 100 | 99 | 90 |
| (5) potassium salt of (1) | 100 | 100 | 100 | 100 | 100 | 95 |
| (6) pyridine salt of (1) | 100 | 100 | 100 | 100 | 80 | 90 |
| (7) dodecylamine salt of (1) | 100 | 100 | 100 | 100 | 99 | 100 |
| (8) ethylenediamine salt of (1) | 100 | 100 | 99 | 100 | 95 | 95 |
| (9) diethylenetriamine salt of (1) | 100 | 100 | 100 | 100 | 98 | 98 |
| (10) glycine salt of (1) | 100 | 100 | 100 | 100 | 100 | 98 |
| (11) aniline salt of (1) | 100 | 100 | 100 | 100 | 100 | 100 |
| (12) calcium salt of (1) | 100 | 100 | 100 | 100 | 100 | 98 |
| (13) magnesium salt of (1) | 100 | 100 | 100 | 100 | 95 | 95 |
| (14) "Mylone" [b] | | | | | 100 | 98 |
| (15) "Vapam" [c] | | | | | 50 | 50 |
| (16) Control | | | | | 50 | 30 |
| | 0 | 0 | 0 | 0 | 0 | 0 |

NOTE.—See footnotes at bottom of Table 2.

Table 2

| Compound | Percent Kill | | | | | |
|---|---|---|---|---|---|---|
| | 250 p.p.m. | | 100 p.p.m. | | 50 p.p.m. | |
| | F | L | F | L | F | L |
| (1) pentadecylbenzene-sulfonic acid [a] | | | | | 100 | 100 |
| (2) sodium salt of (1) | | | | | 100 | 100 |
| (3) ammonium salt of (1) | 100 | 100 | 100 | 95 | 100 | 100 |
| (4) triethanolamine salt of (1) | 100 | 100 | 100 | 98 | 100 | 100 |
| (5) potassium salt of (1) | 100 | 100 | 100 | 90 | 99 | 95 |
| (6) pyridine salt or (1) | 100 | 100 | 100 | 100 | 100 | 98 |
| (7) dodecylamine salt of (1) | 80 | 95 | | | 90 | 90 |
| (8) ethylenediamine salt of (1) | 100 | 100 | 95 | 98 | 100 | 95 |
| (9) diethylenetriamine salt of (1) | 100 | 100 | 100 | 100 | 98 | 90 |
| (10) glycine salt of (1) | 100 | 100 | 100 | 100 | 100 | 100 |
| (11) aniline salt of (1) | 100 | 100 | 100 | 100 | 100 | 100 |
| (12) calcium salt of (1) | 99 | 99 | 98 | 98 | 100 | 95 |
| (13) magnesium salt of (1) | 100 | 99 | 100 | 99 | 100 | 95 |
| (14) "Mylone" [b] | | | | | 100 | 95 |
| (15) "Vapam" [c] | | | | | 50 | 50 |
| (16) Control | | | | | 50 | 30 |
| | 0 | 0 | 0 | 0 | 0 | 0 |

[a] Commercial product.
[b] Commercial nematocide comprising dimethyltetrahydrothiadiazine thione.
[c] Commercial nematocide comprising N-methyl dithiocarbamate dihydrate.

EXAMPLE 2

Pre-emergent tests were conducted with sulfonated compounds of this invention on sandy soil containing nematodes. Treatments were applied to 8' x 8' plots, with each treatment being replicated three times in a randomized block arrangement. The treatments were made in June with the compounds being applied at dosages of 100 and 200 pounds in 200 gallons of water per acre. Sufficient water was applied to the test area to seal the surface. Three weeks after application of the sulfonated compounds, two Marglobe variety tomato plants were planted in each plot of one replicate, and corn, Lima beans, squash, carrots, soy beans and oats were also seeded in each plot of one replicate. Observations of these crops were made during the growing season, and in the fall the tomato plants were removed from the soil and compared for root growth. Soil samples were taken two and four months after treatment and examined as follows:

Approximately one pint of soil was taken from each plot, and the three pint composite for each treatment was screened to remove roots and stems. One pint of this screened sample was extracted by the standard Baermann funnel technique for 24 hours. At the end of this period, 25 cc. of liquid was withdrawn and allowed to stand for 30 minutes. 5 cc. portions of the extracted liquid were transferred to each of three Syracuse watch glasses which had been marked off into eight sections for counting purposes. Nematodes present in the samples were counted under a binocular microscope using 30 magnifications. Twenty sections of the counting glasses were examined for each treatment.

Three types of data were obtained as a result of these tests. The soil examinations indicated the nematocidal activity of the sulfonated compounds by the reduction of nematodes. Observations of the germination and development of the seeded crops gave an indication of the general phytotoxicity of the sulfonated compounds. Finally, an examination of the tomato roots determined the extent of injury to transplanted crops. The data obtained are summarized below:

| | Nematodes Present in Soil Extraction Sample[1] | | | |
|---|---|---|---|---|
| | 100 Lbs./Acre | | 200 Lbs./Acre | |
| | After 2 Months | After 4 Months | After 2 Months | After 4 Months |
| (1) pentadecylbenzenesulfonic acid [2] | 469 | 120 | 475 | 43 |
| (2) sodium salt of (1) | 184 | 251 | 185 | 47 |
| (3) dodecylbenzenesulfonic acid [2] | 517 | 50 | 503 | 79 |
| (4) sodium salt of (3) | 124 | 75 | 159 | 48 |
| (5) anthranilic salt of (3) | 403 | 72 | 279 | 66 |
| (6) magnesium salt of (3) | 339 | 89 | 223 | 105 |
| (7) aniline salt of (3) | 44 | 106 | 152 | 123 |

[1] About 1600 nematodes were present in extraction samples of the untreated soil.
[2] Commercial product.

The sulfonated compounds were found to permit normal germination and growth of the seeded crops. Moreover, the sulfonated compounds permitted normal root development and, in many cases, above-normal growth in the case of the transplanted tomato plants.

EXAMPLE 3

Post-emergent tests were conducted on young peach trees growing in sandy soil. Treatments were applied as drenches around the trunk of the trees. Dodecybenzenesulfonic acid, pentadecylbenzenesulfonic acid and their sodium salts were used at a dosage of 200 pounds per acre. Soil samples were taken from each of the trees and extracted by the Baermann funnel technique. Definite reductions in nematode population were obtained.

No injury or phytotoxic effect was noted between treatment and leaf-dropping after the first fall frost.

It is apparent that many differing embodiments can be made in this invention without departing from the spirit and scope thereof. Therefore, it is intended to be limited only as indicated in the appended claims.

We claim:

1. A process for treating nematode-infested soil which comprises impregnating the soil with a toxic quantity of a nematocide comprising as active ingredient a member of the group consisting of dodecylbenzenesulfonic acid, pentadecylbenzenesulfonic acid and alkali metal, calcium, magnesium, ammonium, aniline, anthranilic, triethanolamine, pyridine, dodecylamine, ethylenediamine, diethylenetramine and glycine salts thereof.

2. A process for treating netamode-infested soil which comprises impregnating said soil with a nematocide comprising as active ingredient a member of the group consisting of dodecylbenzenesulfonic acid, pentadecylbenzenesulfonic acid and alkali metal, calcium, magnesium, ammonium, aniline, anthranilic, triethanolamine, pyridine, dodecylamine, ethylenediamine, diethylenetriamine and glycine salts thereof at dosage of at least about 100 pounds per acre of said active ingredient.

3. A process for treating nematode-infested soil which comprises impregnating said soil with a nematocide comprising as active ingredient a member of the group consisting of dodecylbenzenesulfonic acid, pentadecylbenzenesulfonic acid and alkali metal, calcium, magnesium, ammonium, aniline, anthranilic, triethanolamine, pyridine, dodecylamine, ethylenediamine, diethylenetriamine and glycine salts thereof at dosage of about 100 to 250 pounds per acre of said active ingredient.

4. A process for treating nematode-infested soil which comprises impregnating said soil with a nematocide comprising as active ingredient an alkali metal salt of dodecylbenzenesulfonic acid at dosage of at least about 100 pounds per acre of said active ingredient.

5. A process for treating nematode-infested soil which comprises impregnating said soil with a nematocide comprising as active ingredient an alkali metal salt of pentadecylbenzenesulfonic acid at dosage of at least about 100 pounds per acre of said active ingredient.

6. A process for treating nematode-infested soil which comprises impregnating said soil with a nematocide comprising as active ingredient the sodium salt of dodecylbenzenesulfonic acid at dosage of about 100 to 250 pounds per acre of said active ingredient.

7. A process for treating nematode-infested soil which comprises impregnating said soil with a nematocide comprising as active ingredient the sodium salt of pentadecylbenzenesulfonic acid at dosage of about 100 to 250 pounds per acre of said active ingredient.

References Cited in the file of this patent

UNITED STATES PATENTS

| | | |
|---|---|---|
| 2,232,117 | Kyrides | Feb. 18, 1941 |
| 2,485,095 | Harris | Oct. 18, 1949 |
| 2,979,436 | Fox | Apr. 11, 1961 |

UNITED STATES PATENT OFFICE
CERTIFICATE OF CORRECTION

Patent No. 3,034,952            May 15, 1962

Geoffrey H. Beames et al.

It is hereby certified that error appears in the above numbered patent requiring correction and that the said Letters Patent should read as corrected below.

Column 1, line 22, for "nematodes" read -- nematode --; line 28, for "the" read -- this --; column 2, line 61, for "69" read -- 60 --; column 3, Table 2, compound (6), for "pyridine salt or (1)" read -- pyridine salt of (1) --.

Signed and sealed this 28th day of August 1962.

(SEAL)
Attest:

ESTON G. JOHNSON
Attesting Officer

DAVID L. LADD
Commissioner of Patents